UNITED STATES PATENT OFFICE 2,404,608

PROCESS OF UTILIZING ACID SLUDGE

Joseph H. Wells and Philip J. Wilson, Jr., Pittsburgh, Pa., assignors to Carnegie-Illinois Steel Corporation, a corporation of New Jersey No Drawing. Application October 27, 1943, Serial No. 507,885

4 Claims. (Cl. 260—4)

Acid sludge is a waste product which is produced by treatment of coke oven light oil, or lower boiling coal tar fractions, with concentrated sulphuric acid. The sludge is produced by washing the material, such as coke oven light oil, with concentrated sulphuric acid, and consists of two main portions, first, a solution of concentrated sulphuric acid; and, second, organic materials which have been rendered insoluble in the oil by the action of the acid. The organic matter consists of unsaturated compounds which have been polymerized by contact with the acid, and with it may also be present sulphonic acids and sulphones, and many other compounds of unknown and complex compositions.

By addition of water, which may be added in amounts up to twice the volume of acid which was originally added, the sludge and acid may be caused to separate into two layers, an upper one containing most of the organic matter; and the lower the diluted sulphuric acid.

The upper layer is drawn off and the acidity, which is due to entrained sulphuric acid and to acid organic compounds, is neutralized by addition of ammonia. The neutral product is brown, and is soluble in water. It contains some water, and more water may be added, if desired, to give a brown, neutral, aqueous solution.

The present invention involves the discovery that the volume of rubber may be extended by adding to it the organic matter of the aforesaid sludge, in relatively large amounts, without lowering the physical properties of the rubber below a practical level. This organic matter of the sludge is resinous and sticky, which is often rather viscous; and for use in the present invention, it is neutralized as described above, dehydrated, and incorporated in predetermined amounts in a rubber composition during compounding thereof.

The process is as follows:

The neutral solution of the resinous organic matter is evaporated to remove all the water at a temperature preferably of around 100° C., but should not be materially in excess of 200° C. For this purpose a rotary drum dryer is satisfactory, or the material may be heated under vacuum. The dried product is a hard, brittle, brown solid resin.

This material is combined with the rubber during the compounding operation by working the rubber in heavy rolls during which the compounding ingredients are added and thoroughly worked in. This is the usual compounding process. During the working the resinous matter crumbles and mixes uniformly with the compounded rubber to increase the volume. The increase in volume depends on the proportion of resinous matter added.

Addition of the rubber extender does have an effect on the properties of the finished rubber, such as the tensile strength or resistance to abrasion, but the decrease in these properties can be regulated by addition of the proper proportion of resinous matter so that it does not fall below a commercially practical limit.

Instead of the resinous matter which has been neutralized with ammonia, resinous matter neutralized with other inorganic alkalis, or organic bases may be used. However, the use of a neutralizing agent which does not render it insoluble is desirable since in the water soluble form the neutralized resin is handled more readily.

The drying operation for the resin solution may coincide with the working which incorporates it into the rubber if the water content of the solution is not too high and the solution is added at such a rate that evaporation proceeds during the working.

The effect of the resin on the rubber may be illustrated by the following formula for a tire tread compound:

| | Parts by weight |
|---|---|
| Rubber | 100 |
| Sulphur | 3.2 |
| Stearic acid | 1.5 |
| Zinc oxide | 5 |
| Antioxidant | 1.5 |
| Accelerator | 1 |
| Carbon black | 55 |

To the foregoing mixture there were added 25 parts by weight of the above-described resin neutralized with ammonia, and the mixtures were vulcanized. The tensile strength at the break of the mixture containing the neutral resinous matter was approximately 75 per cent of the original rubber; and the abrasion resistance was about 50 per cent.

We claim:

1. In a process of compounding rubber, the method comprising incorporating a dehydrated resin into a rubber composition while compounding the said composition, thereby extending the volume of the rubber in the said composition, the said dehydrated resin being obtained by washing coke oven light oil with concentrated sulphuric acid, diluting the resulting sludge reaction product with water, thereby causing separation of resinous organic matter from the acid, drawing off the said resinous organic matter, neutralizing the said resinous matter, dissolving the resinous matter in water, and dehydrating the neutralized resinous matter.

2. In a process of compounding rubber, the method comprising incorporating a dehydrated resin into a rubber composition while compounding the said composition, thereby extending the volume of the rubber in the said composition, the said dehydrated resin being obtained by washing coke oven light oil with concentrated sulphuric acid, diluting the resulting acid sludge reaction product with water, thereby causing separation of resinous organic matter from the acid, separating resinous organic matter from the diluted acid, neutralizing the resinous organic matter in water, and evaporating the resulting solution to dryness until the resin becomes dehydrated.

3. In a process of compounding rubber, the method comprising incorporating a dehydrated resin into a rubber composition while compounding the said composition, thereby extending the volume of the rubber in the said composition, the said dehydrated resin being obtained from acid sludge produced by treating coke oven light oil with concentrated sulphuric acid, diluting the resulting acid sludge reaction product with water, thereby causing separation of resinous organic matter from the acid, separating resinous organic matter from the sludge, neutralizing the separated resinous matter, dissolving the neutralized resinous matter in water, and evaporating the resulting solution to dryness.

4. In a process of compounding rubber, the method comprising incorporating a resin into a rubber composition while compounding the said composition, thereby extending the volume of the rubber in the said composition, the said resin being obtained from acid sludge produced by treating coke oven light oil with sulphuric acid by washing the oil with concentrated sulphuric acid, diluting the resulting acid reaction product with water, thereby causing separation of resinous organic matter from the acid, separating resinous organic matter from the diluted acid, neutralizing the said resinous matter, and dissolving the neutralized resinous matter in water, the resinous solution being incorporated into the rubber composition in predetermined amounts to effect evaporation of water therefrom and drying of the resin during working of the rubber composition incident to compounding thereof.

JOSEPH H. WELLS.
PHILIP J. WILSON, Jr.